Nov. 1, 1932.　　A. THOMAS ET AL　　1,885,874
CARD FEEDING MECHANISM
Filed Aug. 9, 1929　　11 Sheets-Sheet 2

INVENTORS
ARTHUR THOMAS
& RICHARD FITZ POWER.
BY:~
Sydney E. Page.
ATTORNEY

Nov. 1, 1932.  A. THOMAS ET AL  1,885,874
CARD FEEDING MECHANISM
Filed Aug. 9, 1929  11 Sheets-Sheet 3
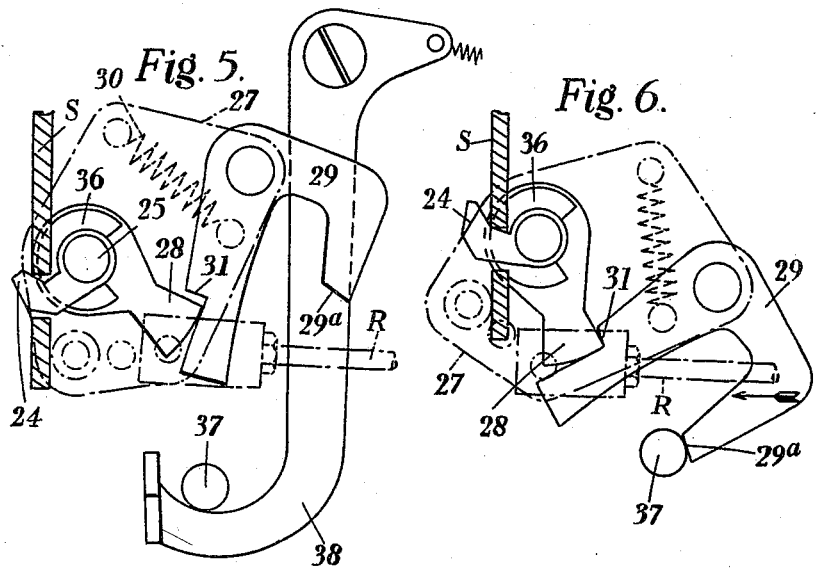
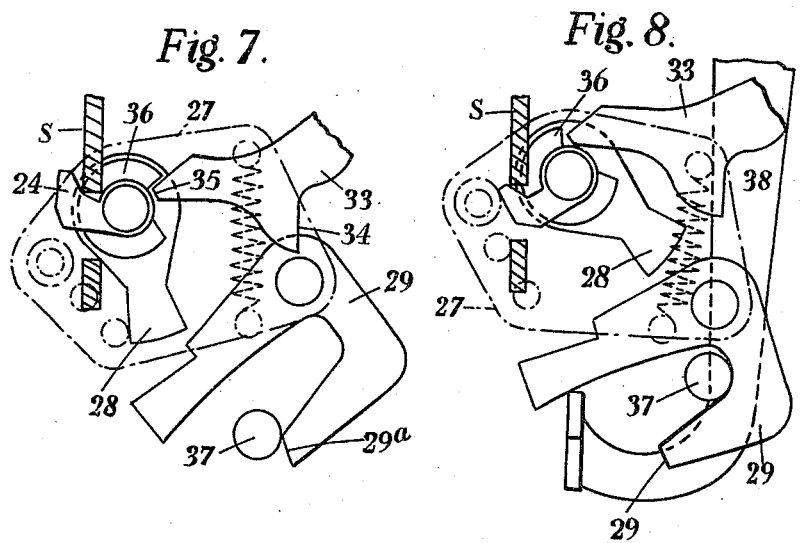
INVENTORS
ARTHUR THOMAS
& RICHARD FITZ POWER
BY:-
Sydney E. Page.
ATTORNEY

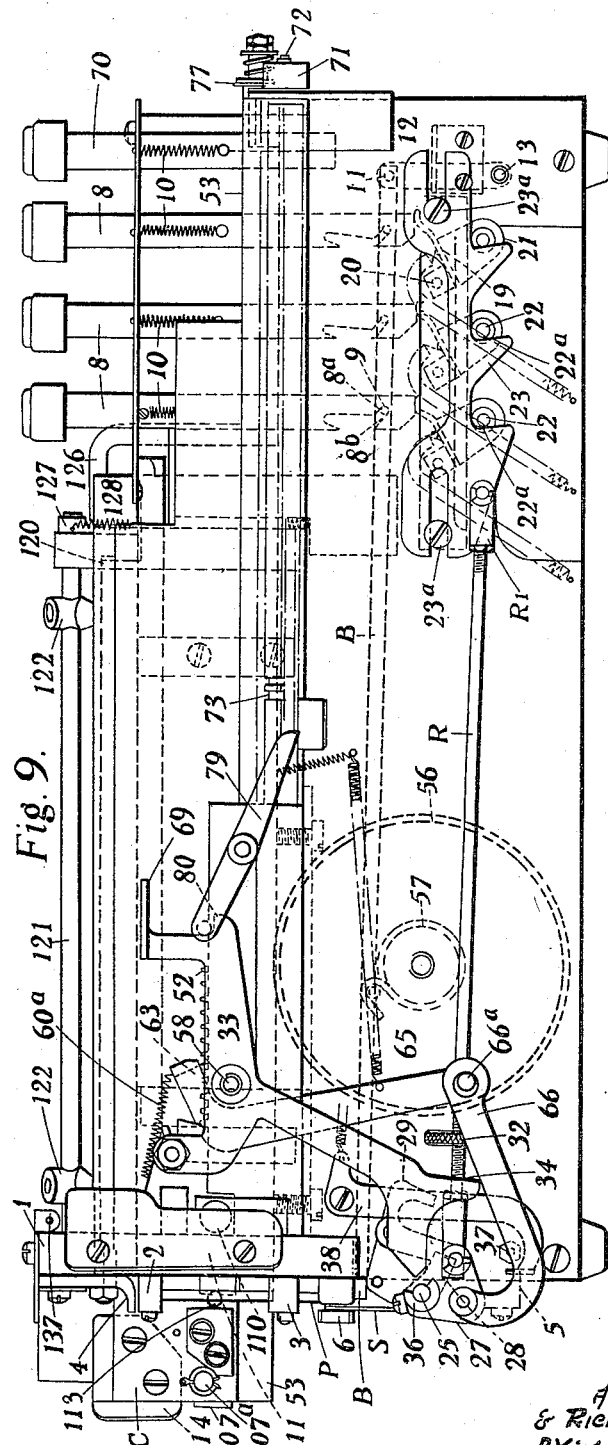

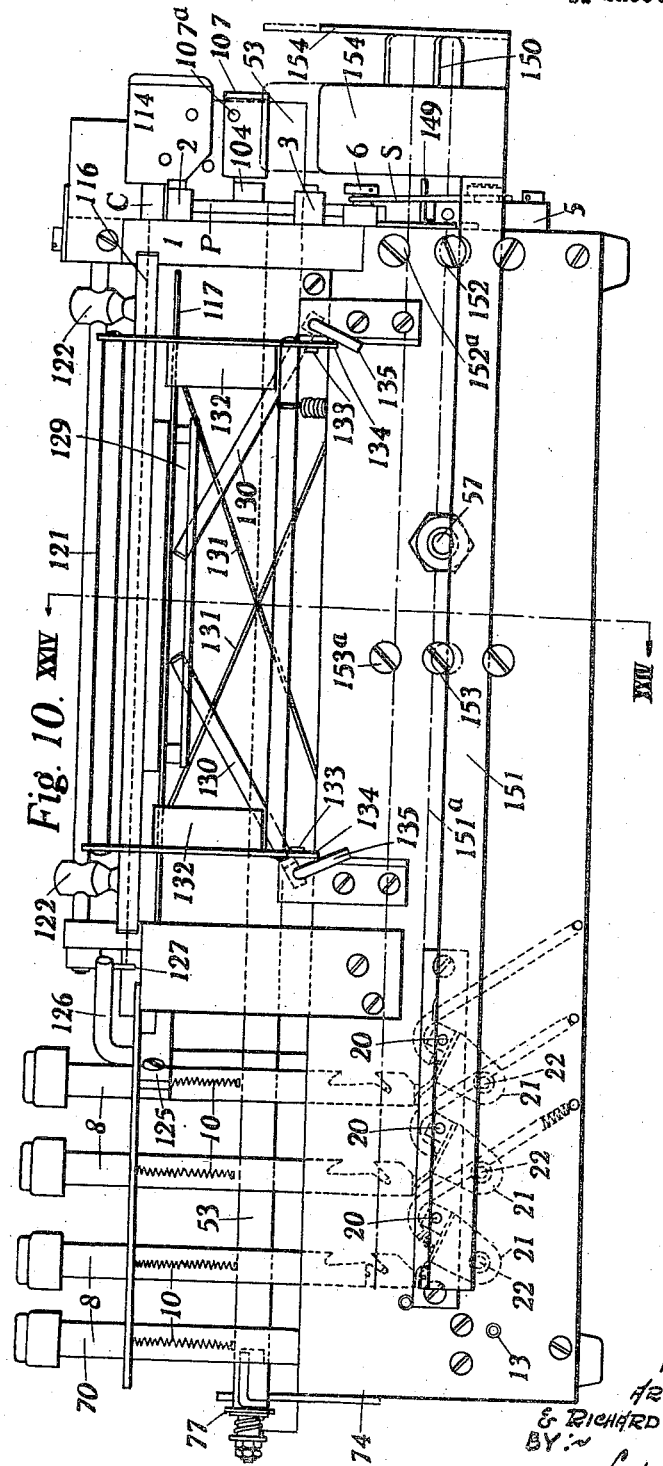

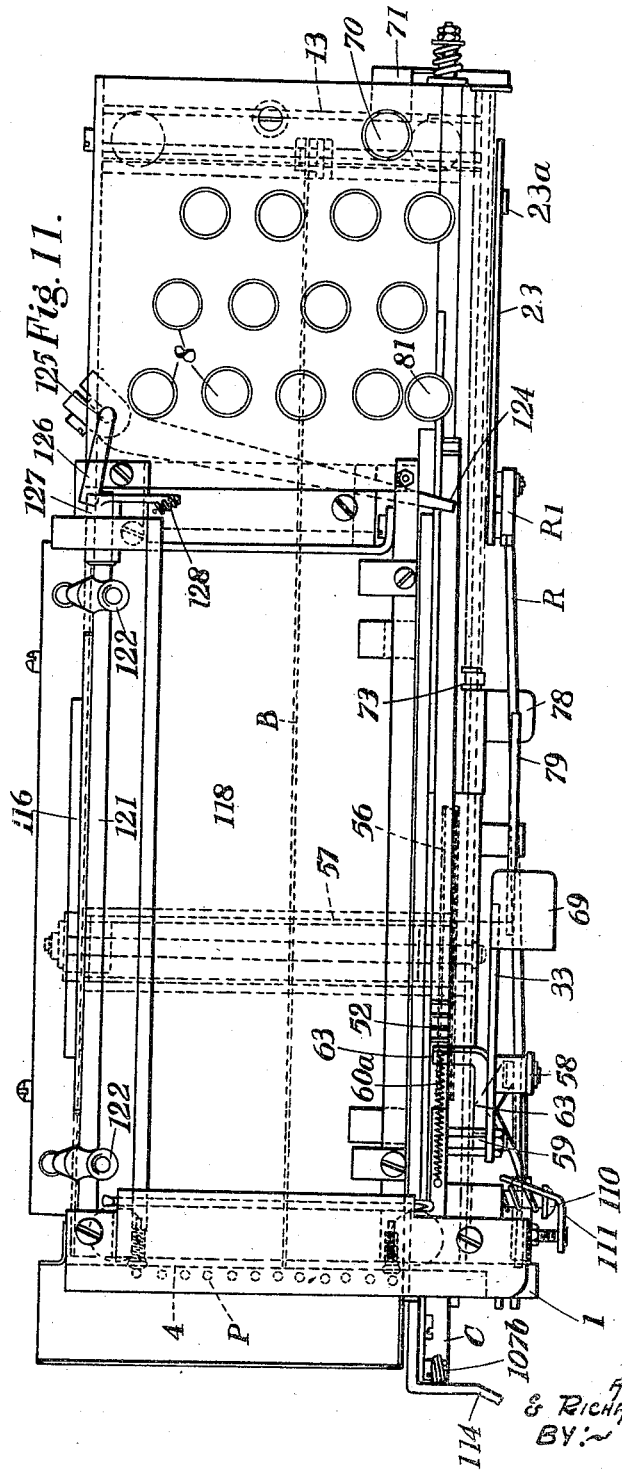

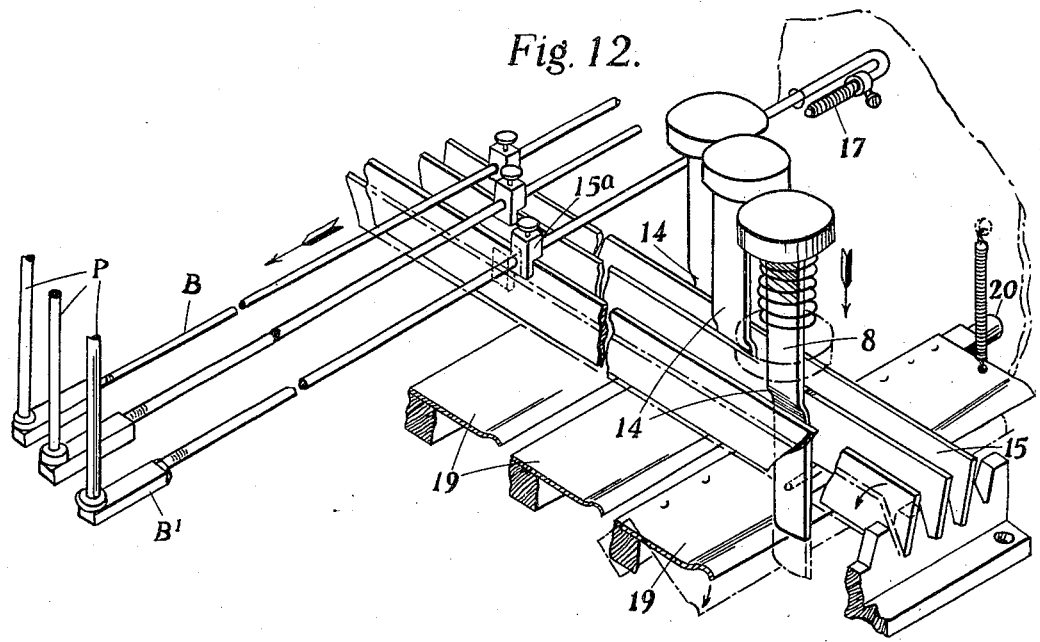
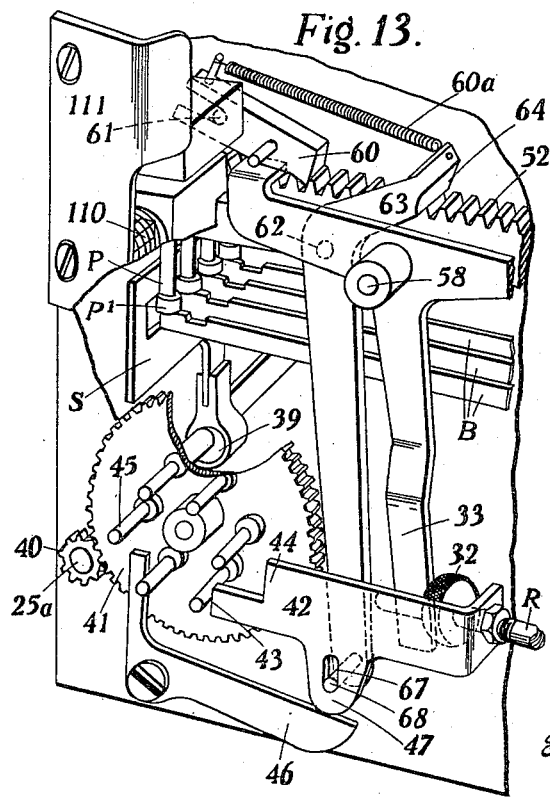

Nov. 1, 1932.  A. THOMAS ET AL  1,885,874
CARD FEEDING MECHANISM
Filed Aug. 9, 1929    11 Sheets-Sheet 8
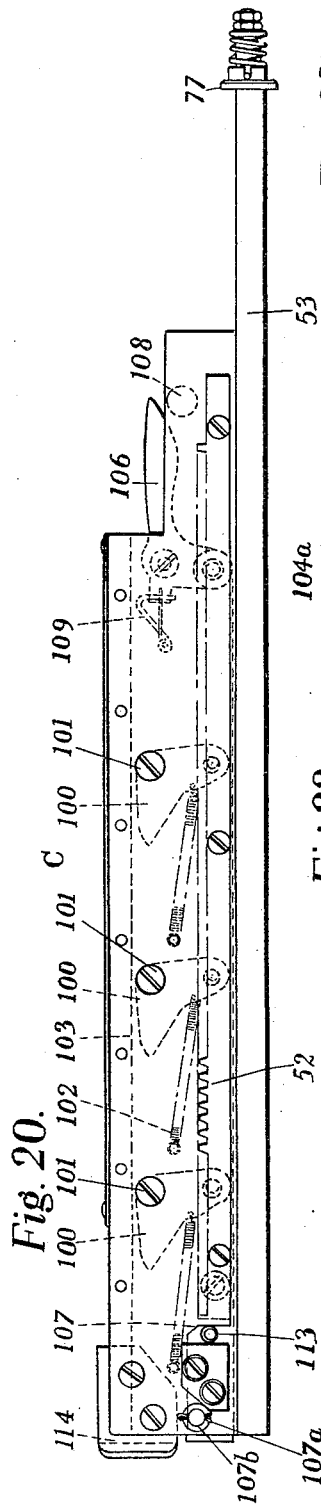
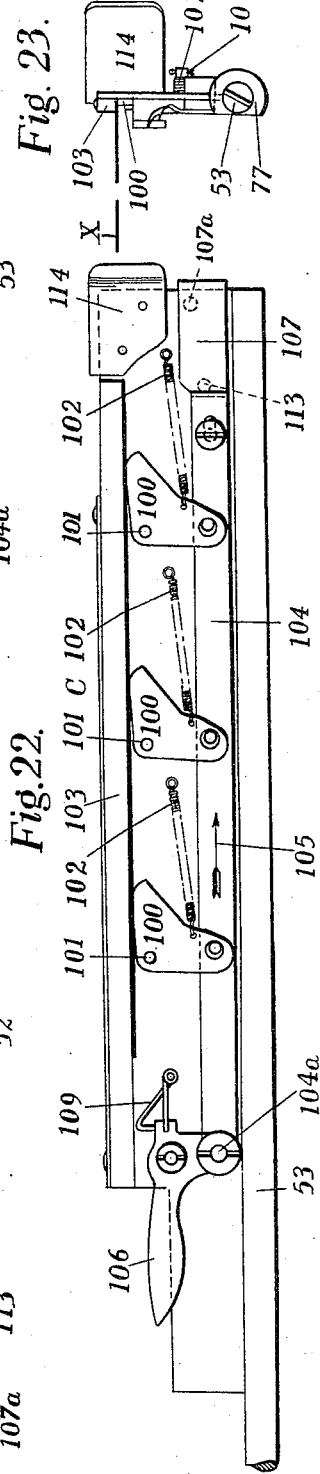
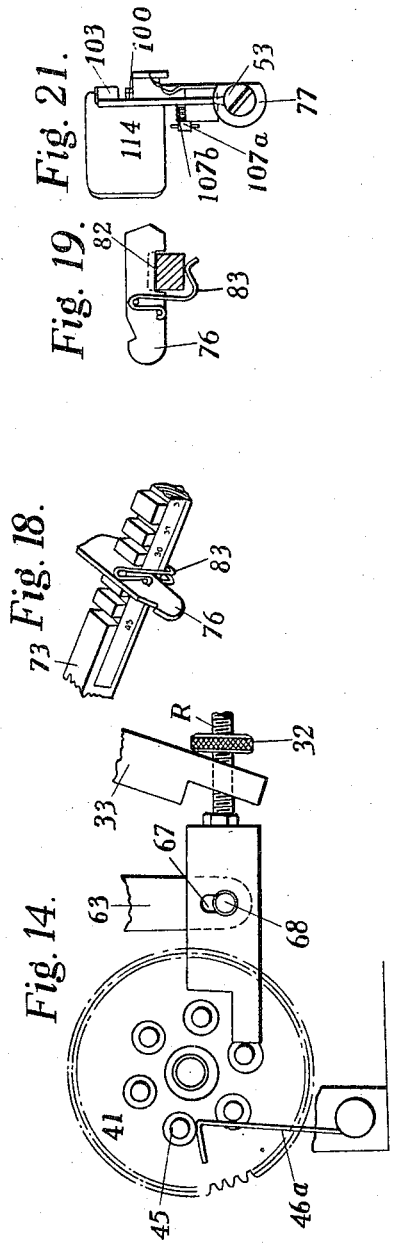
INVENTORS
ARTHUR THOMAS
& RICHARD FITZ POWER
BY:~
Sydney E. Page
ATTORNEY Nov. 1, 1932.  A. THOMAS ET AL  1,885,874
CARD FEEDING MECHANISM
Filed Aug. 9, 1929    11 Sheets-Sheet 9

INVENTORS
ARTHUR THOMAS
& RICHARD FITZ POWER.
BY:-
Sydney E. Page.
ATTORNEY

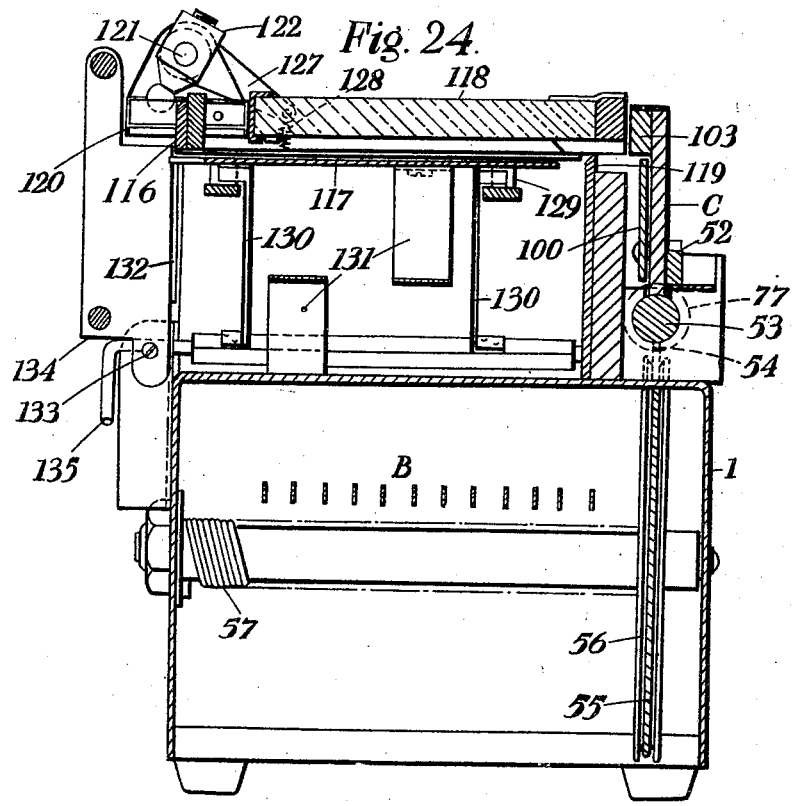
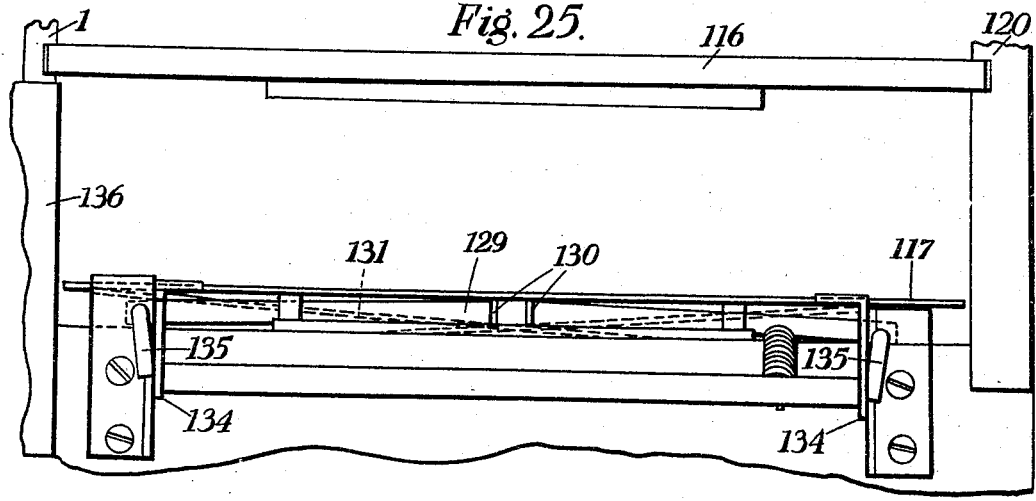

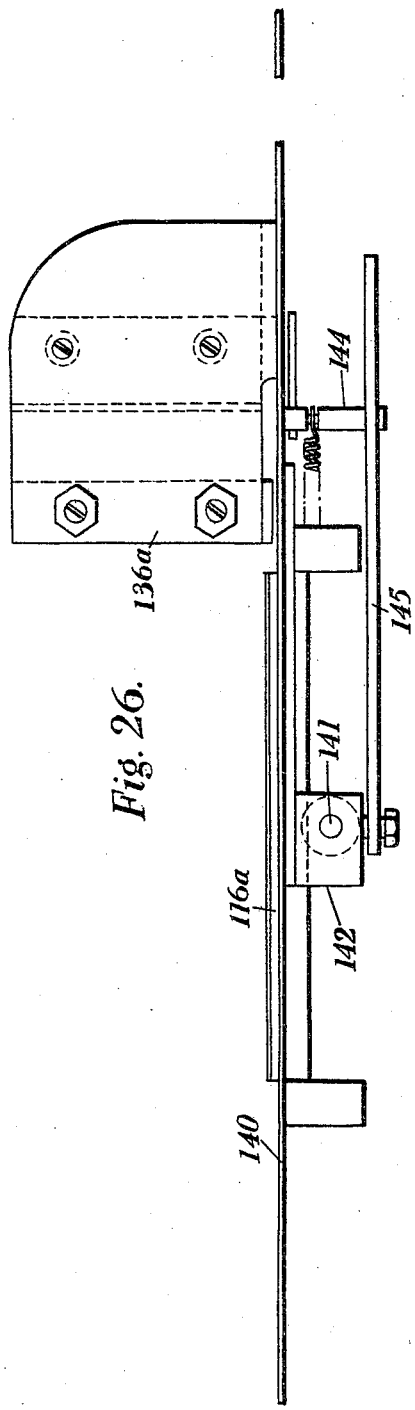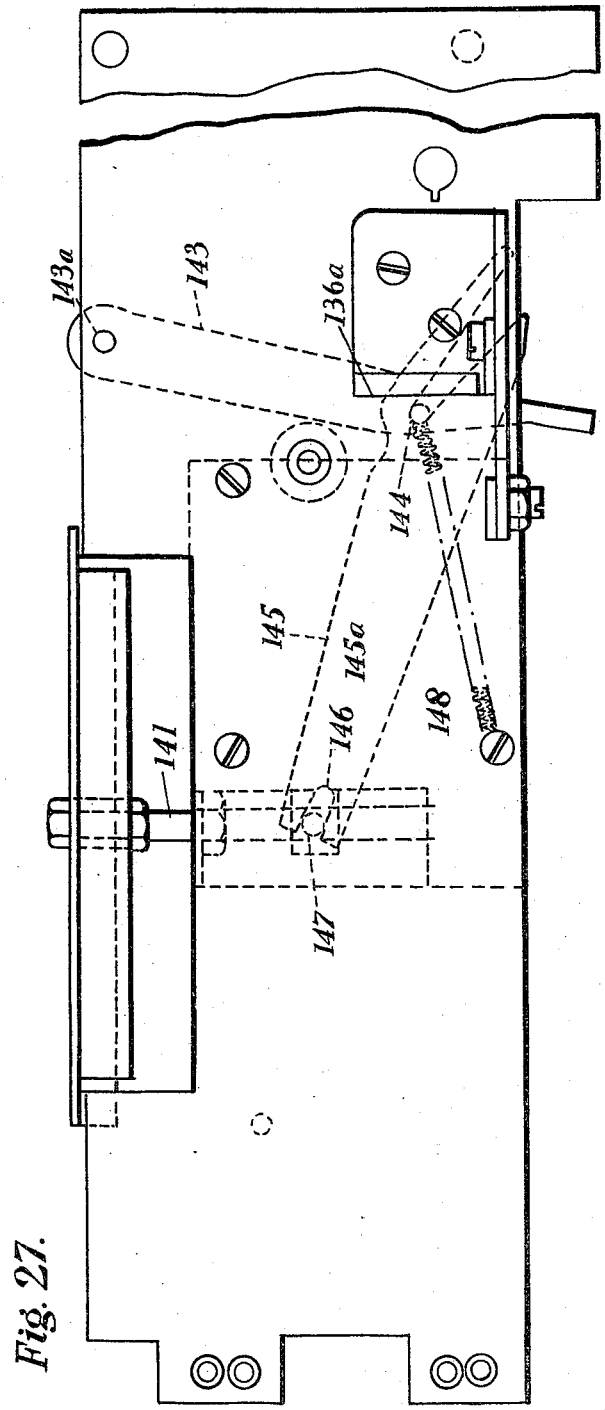

Patented Nov. 1, 1932

1,885,874

UNITED STATES PATENT OFFICE

ARTHUR THOMAS, OF THORNTON HEATH, AND RICHARD FITZ POWER, OF HAMPSTEAD, LONDON, ENGLAND, ASSIGNORS TO THE ACCOUNTING & TABULATING CORPORATION OF GT. BRITAIN LIMITED, OF LONDON, ENGLAND

CARD FEEDING MECHANISM

Application filed August 9, 1929, Serial No. 384,602, and in Great Britain August 20, 1928.

This invention relates to card feeding mechanism for use in presenting cards to operating zones, such as punching or printing, commonly employed for instance in accounting and tabulating or recording machines.

The primary object of the invention is to provide a construction assuring the correct alignment of a card when being subjected to an operation such as punching or printing, and to attain this end by assuring the correct movement of the carriage carrying the card to the apparatus, and the correct presentation of the card to the carriage so that when the card arrives at the apparatus it is automatically and accurately presented.

The travel of the carriage may be accomplished in one or more steps depending on the use to which the carriage is put, for instance, the carriage may in one step take a card to a printing machine and in a second step pass on with the card to the end of its travel, and then release the card, or during the course of its travel the carriage may take a card through a successive series of operating zones. Particularly is such a device suitable if the card or equivalent article is wet. In such cases the card might be carried through a drying zone by the carriage, practically the whole of the card being subjected to the desiccating atmosphere.

The card being held by the carriage along one edge only, the carriage is more or less a travelling arm holding the card which latter is substantially a free card supported in cantilever fashion from the carriage so that both sides are available for printing or other operations.

The present invention, however, is concerned chiefly with feeding cards to tabulating and recording machines, or the like, and, accordingly, will be more fully described in its operation and control with relation to such type of machines which handle cards usually arranged in a pile.

According to the invention a card feeding mechanism includes in combination a carriage having automatically operated grips for engaging a card edge and dropping the card at a predetermined interval of travel and means for presenting a card edgewise for engagement by the carriage when the grips are open.

The presentation of the cards edgewise to the carriage may be and preferably is effected by a picker operated by the carriage itself; preferably also, the picker or its equivalent and the carriage are in parallel relation, and the picker pushes the card against the carriage before the grips close, so that a card is accurately aligned by the picker and the carriage before the grips engage the card edge.

In a card feeding mechanism according to the invention the carriage is preferably mounted for reciprocation to operate the picker and receive a card at one end of its stroke, travel to the other end with the card, drop it and return for the next card, whereby the carriage controls the feeding of cards thereto one by one, but preferably the carriage is a key-action carriage operated in one direction by key action and returned to normal or resetting position by being pushed back, causing the escapement to run over the rack carried by the carriage at the expense of tightening the tension which assures its step by step forward movement after each key action.

Preferably also the escapement of the key action carriage is arranged so that the tension operates to return the keys to normal position.

In referring to the resetting of the parts of a card feeding mechanism according to the invention or to a resetting position, is meant, so far as regards key action or key operated mechanism, the position of the parts before any key is depressed.

In a preferred form the cards are fed to a platform and the carriage is in the form of a plate on edge, moving alongside a platform, the carriage being provided with abutments disposed about a card thickness above for cooperation with pivoted spring controlled gripper plates movable up to the abutments to engage an overlying card on the platform at a predetermined position of travel of the carriage.

The grippers may be controlled by a common trip bar automatically moved to open the grippers and tension their springs when the carriage arrives at a position to drop a card, said trip bar being held with the grippers open by a spring detent engaging the end of the bar and adapted to be disengaged at will, or automatically on the carriage being disposed for receiving a card on the gripper, and in order to assure the correct relation between the carriage and the platform at the end of each return stroke, so that on the subsequent forward stroke the card is properly presented to an operating zone to assure that the operation is effected on a predetermined position on the card, the carriage may be provided with a register pin adapted to engage with the platform to assure specific relation therewith, said pin actuating the spring detent, thereby assuring correct relative position of card and platform and travel thereover.

Card feeding mechanism according to the present invention may comprise aligning means for the card adapted to engage the card on two contiguous edges and move it against abutments set to receive the opposite contiguous edges.

To this end the card feeding mechanism hereinbefore described may comprise a card aligning shutter co-operating with an abutment spaced from the shutter to form with the carriage and picker (when advanced to the carriage) three sides of a box within which a card is located by the picker, the fourth side being formed by the shutter which pats a card into engagement with the abutment previously to the advance of the picker, and preferably the card aligning shutter is automatically operated by the carriage as it moves to position relatively with the platform to receive a card.

Conveniently the shutter is in the form of a hinged flap and the carriage is formed with an arm for tilting the flap.

The feeding of cards to a carriage according to the present invention may be effected from the top of a pile of cards or from the bottom, that is to say, the picker therein described may operate to move one card at a time from the bottom of a pile of cards disposed on the platform, the latter being slotted out to receive the picker and a contiguous card support movable therewith level with the platform. To this end the picker is moved transversely to the direction of travel of the carriage by a spring influenced rocker arm operated by the carriage actuating a second rocker arm connected between the first said rocker arm and the picker, whereby the picker moves towards the carriage as the latter approaches the position to receive a card, and is retracted to engage the next card as the carriage moves forward with the card just previously received.

When, however, the cards are taken from the top of a pile, the cards may be located in a magazine having an open or transparent top, and resilient means maintaining the top card at the level of the grippers in the carriage.

In such an arrangement the picker may be carried on a rocker shaft arranged over the magazine and the carriage with a ramp, for operating one arm of a bell crank, the other of which is connected by a crank element to the rocker shaft, whereby the picker is actuated as the carriage arrives opposite the magazine to receive the card, and in such an arrangement the spring magazine may be held in a collapsible cradle maintained open by the spring and collapsed against the spring pressure by a hinged wall of the magazine, which, when lowered, collapses the cradle and locks it in position for loading the magazine, and when raised permits the spring to open up the cradle, which latter presses the cards to the top of the magazine.

Preferably the cradle includes a plate on which the cards rest and under which the magazine spring is located, and rocking arms slidably connected to the plate at each end, so that as the arms are rocked the plate is raised or lowered, and the hinged wall of the magazine bears on a cam plate connected to the rocking arms to move them as the wall is moved.

A carriage according to the present invention is preferably mounted and guided as regards its vertical setting by the apparatus which is to perform an operation on the card carried by the carriage to it, and the carriage is itself formed with, for instance, a circular slide moved in a single bearing to assure its horizontal setting, thereby a correct presentation of the card to the aforesaid operating apparatus is assured.

The key action by which the carriage is stepped forward is preferably combined with the apparatus for producing the operation on the cards by the apparatus, the said key action controlling the apparatus which may, for example, be a punch or printing machine so that the carriage moves forward one step after the operation is performed as a result of depressing a key of the said key action.

To this end the carriage escapement may include a check pawl and an escapement operatively connected to the key action for simultaneous operation, whereby the key action is only reset when the carriage has completed the corresponding step movement, and preferably the said apparatus is brought into position for operating on the card and withdrawn by an actuating member operated from the key action during the travel of one movement in one direction only of said actuating member, which may be an intermittently rotatable member or a reciprocating member.

Said apparatus may, as fully described in co-pending application Serial No. 384,601 be operated by trip gear or be carried by the sheath of an eccentric rotated through 360° by means of a pawl and ratchet device. The pawl may have two operative faces and the ratchet co-operating lateral abutments, e. g. pins, disposed so that the movement of the ratchet communicated to the sheath is effected by a variable effort, at a maximum, at about half travel of the ratchet.

In another form the eccentric may be driven by means of a pinion connected in the manner of a free wheel to the eccentric, the actuating member in this case being in the form of a rack, the free wheel connection permitting an inoperative return stroke of the rack immediately after a punching operation.

In order that the invention may be more clearly understood, a construction will now be described by way of example wherein the key action carriage card feeding mechanism is employed in conjunction with a punch or perforator for making the holes in the cards according to co-pending application Serial No. 384,601 as they are fed by the carriage step by step to the punches.

Figure 1:
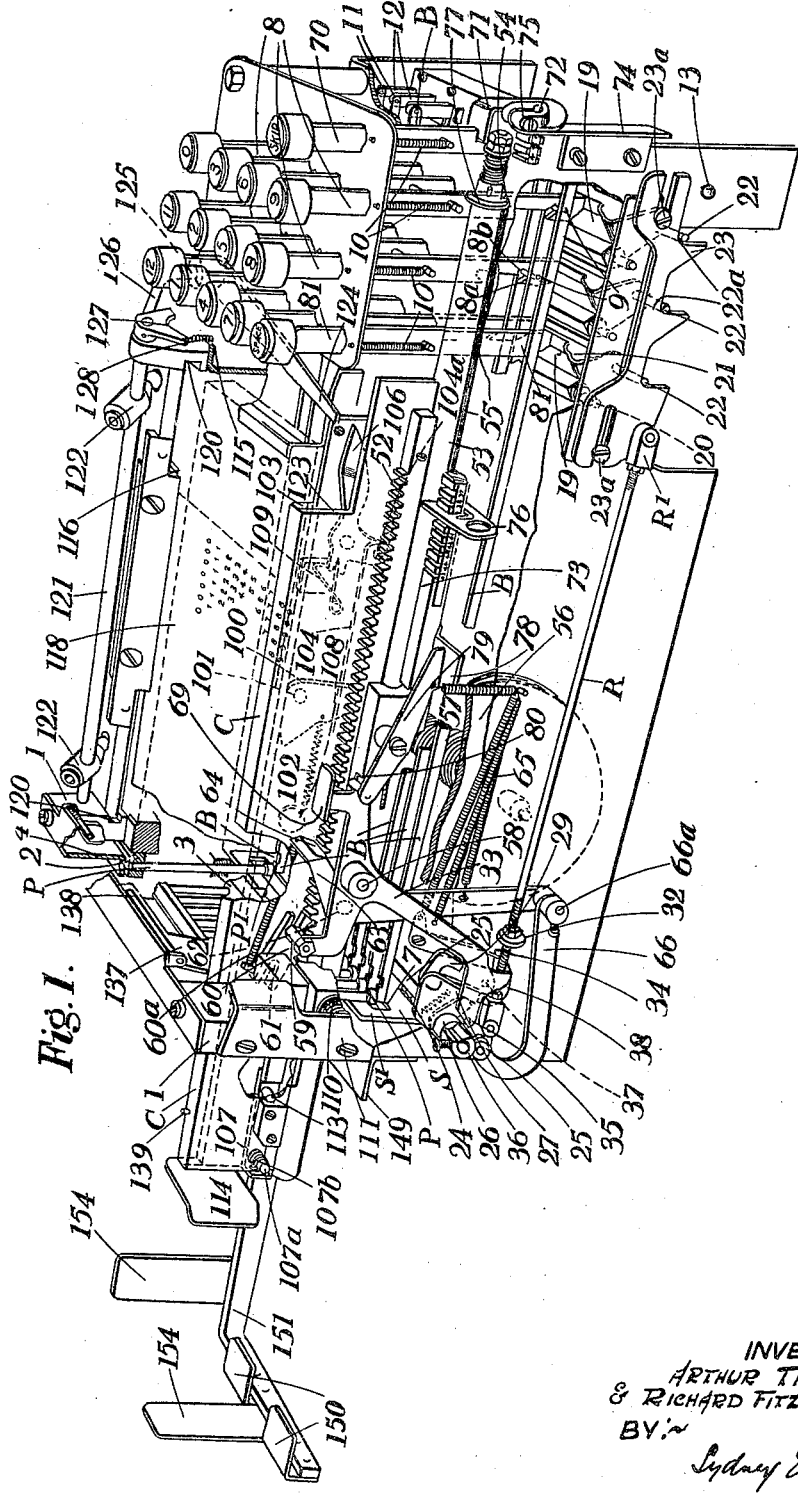
Fig. 1 is a perspective view showing the complete machine parts, being broken away for the sake of clearness.
Figure 2:
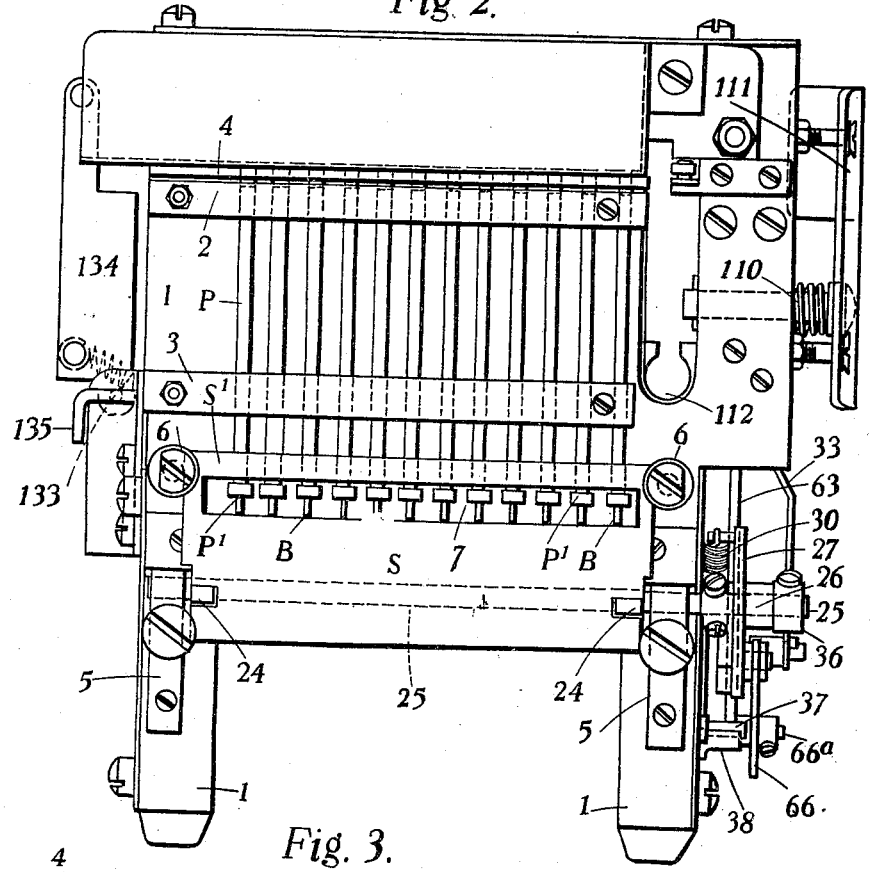
Fig. 2 is an end elevation of the machine, the parts being in inoperative position.

Figs. 5, 6, and 7 and 8 are detail views showing the operation of the striker by means of the mechanism shown in the construction illustrated in Figs. 1, 2, and 9.

Fig. 9 is a front elevation of the machine illustrated in Fig. 1.

Fig. 10 is a rear elevation thereof; and

Fig. 11 is a plan view.

In Figs. 9, 10, and 11 the card receiving device is shown collapsed against the machine.

Fig. 12 is a perspective view showing a modified arrangement for operating the light bars, and a modification of the light bar construction;

Fig. 13 shows in perspective view a modified arrangement for operating the striker.

Figure 17:
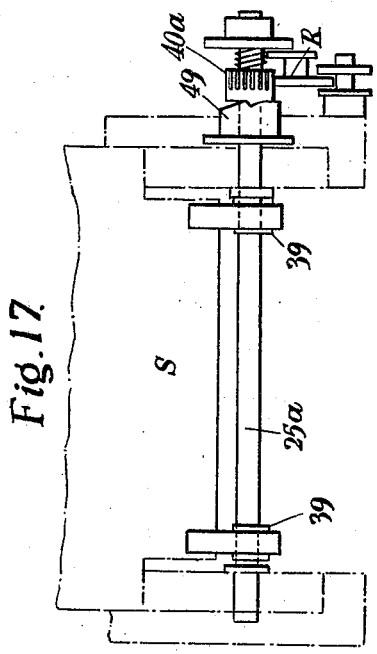
Figure 15:
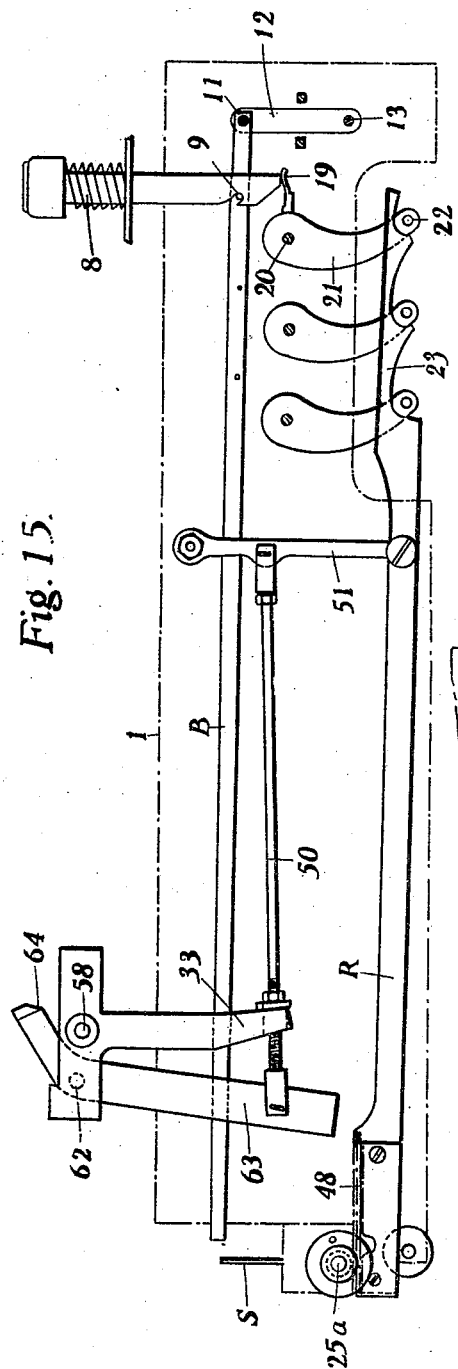
Figure 16:
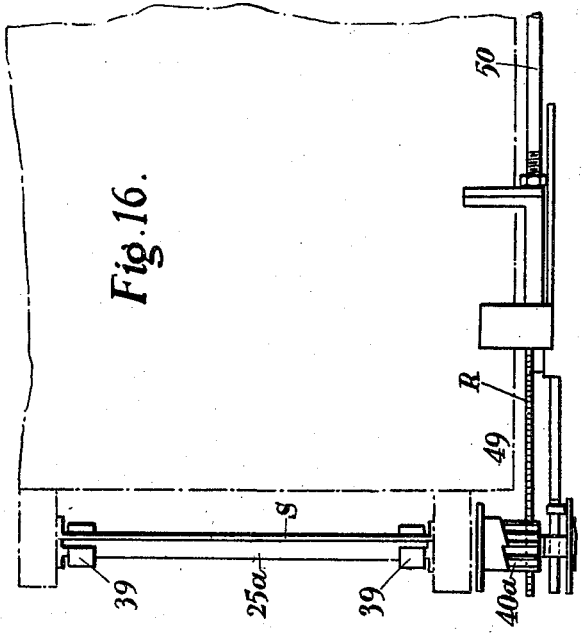

Fig. 14 shows a further modification of such arrangement;

Figs. 15, 16 and 17 show in diagrammatic elevation a plan and end view respectively, a still further modified arrangement for operating the striker from a key action.

Figs. 18 and 19 are a perspective view and sectional elevation of a modified form of dog for use with a skip mechanism;

Fig. 20 is a front elevation of the carriage; of which

Fig. 21 is an end view, the parts of the carriage being in non-gripping position;

Fig. 22 is a rear elevation of the carriage showing the parts in gripping position; and Fig. 23 is an end view thereof;

Fig. 24 is a central sectional elevation taken on the line XXIV—XXIV of Fig. 10;

Fig. 25 is a fragmentary rear view of the card magazine showing the cradle collapsed for the reception of a batch of cards;

Figs. 26 and 27 show in diagrammatic elevation and plan respectively a modified arrangement employing picker mechanism for removing cards from the bottom of the pile.

In the drawings like reference numerals designate the same or similar parts.

As above indicated the punch mechanism of the perforator now to be described is the subject of co-pending application Serial No. 384,601 and the essential feature of this application is the carriage. The whole machine will now be described as in co-pending application Serial No. 384,601 in order that the governing functions derived from the carriage as herein described can be fully ascertained, bearing in mind that the carriage apart from its capacity to feed cards past the punches controls also the resetting of the punch operatives and keys.

The carriage in its preferred form is shown in Figs. 20, 21, 22, and 23 and a consideration of these Figures will show that the carriage as hereafter more particularly set out is in the form of a plate on edge moving alongside a platform or a magazine for the cards as hereafter explained and the grippers 100 in the form of spring-controlled pivoted triangular plates are pivoted at 101 on that side of the carriage juxtaposed to a platform or magazine for the cards, the carriage being formed at its upper part with abutments 103 conveniently attained by the formation of a shoulder running for the length of the carriage and therefore overlapping each gripper plate and forming an abutment therewith.

Referring now to Figs. 1 to 12 and to the punch mechanism of the machine, at one end of the machine a vertical support 1 is provided for the punches P, the support including two horizontal guide bars 2 and 3 one for each of the punches, and above the guide bar 2 a narrow die plate 4. The upper guide bar 2 and the die plate 4 may be formed integrally by slotting transversely a bar so as to provide the necessary opening between the guide and the die plate for the passage of a card after a punching operation.

Preferably, however the die plate and guide are relatively adjustable so that the opening between them may be varied.

The punches P are loosely disposed within the guide bars 2 and 3 and at their lower ends are provided with a bush or ring to form on each punch a head P'. Under each punch P is disposed the extremity of a light selector bar B.

The striker S is in the form of a vertical plate mounted for reciprocation between pairs of guides indicated at 5 and 6 formed on the support 1 hereinbefore referred to.

The upper part of the striker is slotted as indicated at 7 for the reception of the end of a light selector bar B so that on an upstroke of the striker S the interposed bar B is struck up and also the punch P whose head overlies the interposed bar. The slot 7 of the striker S is large enough to permit the necessary travel of the punch to effect a punching operation, and the upper part S' of the striker though clear of the heads during an upstroke engages the heads on the downstroke of the striker and definitely pulls back the previously displaced punch P to normal position, and as hereafter more fully explained the respective key which causes the bar B to be interposed between the striker and the respective punch is reset.

Figure 3:
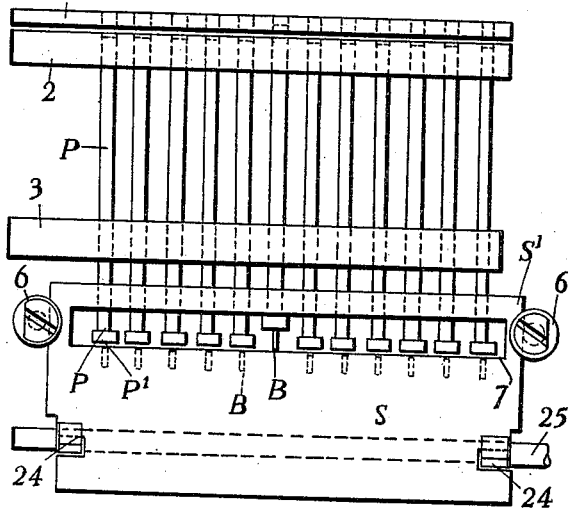
Fig. 3 is a similar view to Fig. 2 only such parts being included as to show the striker raised as a result of a key operation and a punch displaced.
Figure 4:
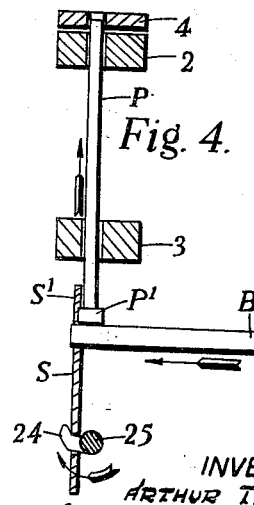
Fig. 4 is a side elevation of the parts in the position shown in Fig. 3.

As clearly shown in Fig. 3 the effect of raising the striker is to obstruct the other selector bars from a movement towards their respective punches as that part of the striker S below the slot 7 stands in the path of movement of the bars. This obstruction to the selector bars necessarily prevents the depression of keys which are consequently locked by the striker during a punching operation.

By such an arrangement should the punch stick in a card leaving the key depressed partially or wholly it is impossible for an operator to depress another key and thereby produce an inaccurate record on a card.

A key is provided for each selector bar and correspondingly therefore there is a punch for each key so that on the operation of a key a hole is punched.

As clearly shown in Fig. 9 the stem 8 of each key is formed with cam faces 8a and 8b for engaging a pin 9 on a selector bar B so that depression of the key causes the selector bar to be pushed forward towards the striker and when the key is released to be drawn back therefrom.

Each key may be spring controlled as indicated at 10 and preferably the bars B are pivoted at 11 to a link 12 pivoted at 13 on the frame of the machine. By such an arrangement the bar B may be pushed forward under the operation of the key and its extremity lifted when the striker rises.

Instead of direct operation between the key stem 8 and a bar B the key stem may operate intermediate members disposed at an angle, for instance at right angles to the bars B when the keys are not disposed over the bars, for instance are arranged to the side of them.

For example as shown in Fig. 12 the stems 8 may be offset or cranked as indicated at 14 to form a cam face so that the depression of the key is communicated to the respective selector bar B by the cam face rocking a plate 15 virtually hinged in a toothed or a rack-like form of support 16 by which the bar B is more or less flicked through the agency of adjustable abutments 15a carried on the bar members B, bearing in mind that the bars B are so light that the lightest tap on a key causes the respective bar to be moved and to be interposed between the striker S and the respective punch P. A plurality of abutments 15a may be mounted on bars B and adjusted so that one key may move a plurality of bars.

In the construction shown in Fig. 9 the bars B are hinged to the link 12 hence as previously stated they can be tilted up about the pivot 11 as the end moves up with the striker. The bar B, may, however, as shown in Fig. 12 pass through the end frame of the machine the bar B having sufficient flexibility to permit the other extremity to move up and down with the striker, whilst the bar is of sufficient length to permit the longitudinal displacement against the compression of a spring indicated at 17 compressed between an adjustable abutment 18 on the bar and the end frame of the machine which spring causes the return of the bar to normal position after a punching operation.

Further, as shown in Fig. 12 the bars may be composite members having relatively strong extremities B' to take the thrust from the striker and transmit it to the punches, the other part of the bar B being as light as possible, having in mind it has merely to transmit the effort from the key to the part B'.

From the foregoing it will be seen that the depression of any key causes the displacement of a bar B so that its end is interposed between the striker and the punch.

In accordance with the invention the striker S is reciprocated, that is, moved to strike and withdraw during movement in one direction of an actuating member.

In the preferred construction the actuating member is a rod R, Fig. 1 which is actuated on the depression of any one of the keys and the arrangement is such that the whole of the operation of perforating a card and withdrawing the punch from the hole is completed in the downstroke of a key thereby leaving the whole of the period of the return stroke available for the travel of the card to the next position.

To this end the keys are disposed in abutting relation with rocking levers each of which is provided with an arm connected to the actuating member R of the striker.

As shown in Fig. 1 each row of keys has a common rocking lever 19 pivoted at 20 so that the depression of any key in a row will rock the respective lever 19, and each lever is formed with an arm 21 which carries a pin 22 projecting into the path of abutment 22a on a sliding member 23 movable on guide pins 23a and connected to the rod R so that the rocking of any lever 19 causes a sliding movement of the member 23 which is transmitted to the actuating member R.

Preferably, there are twelve keys identified by numbers on their heads, as clearly shown in Fig. 1 and in addition two keys are employed, namely a spacing key and a skip key hereafter referred to, but the depression of any one of the numeral keys causes the operation of the actuating bar R in addition to the movement of a bar B each numeral key having the cam faces 8a and 8b hereinbefore referred to by which they operate the bars through the agency of the pins 9.

To effect the upward and downward movement of the striker during the movement in one direction of the actuating member R the striker is carried on fingers 24 pivoted on a rod 25 which passes through striker supports 1 and through a hub 26 on a plate 27 to which latter the actuating member R is connected.

On the rod 25 is fixed an arm 28 which therefore forms with the finger 24 a bell crank, and is in nature a tailpiece thereto, and on the plate 27 is pivotally mounted a trip member 29 controlled by a spring 30. As the plate 27 is oscillated on the displacement of the actuating member R a shoulder 31 on the trip member 29 engages the tail 28 of the striker operating member 24 causing the latter to rotate about the rod 25 and cause the upward movement of the striker.

The actuating member R is provided with an adjustable abutment 32 by which the escapement mechanism of a card feeding carriage employed in the apparatus and hereafter particularly referred to, is operated when a key member is depressed causing displacement of the actuating member R, the escapement mechanism including a T-shaped member 33 provided with a shoulder 34 which is engaged by the abutment 32 on the actuating member R and a nose 35.

On the rod 25 a shoulder is formed for engagement by the nose 35 and the lever 33 to effect the movement of the rod 25 and reverse movement of the finger 24 to permit or cause a downward movement of the striker.

It will be seen, therefore, that during the first movement of the rod R through the agency of the plate 27 and trip 29 and tail 28, the finger 24 is rocked so as to raise the striker and in the final movement of the rod R its abutment 32 presses forward the T-lever 33 of the carriage escapement mechanism and the nose 35 of the T-lever is caused to effect a retraction of the striker. The shoulder with which the nose operates may as shown in Fig. 1 be formed by a slotted sleeve member 36.

The operation of the finger 24 by the trip member 29 through the agency of the shoulder 31 and the tail piece 28 has already been explained and it will be noted that below the plate 27 is a trip pin 37 which stand in the path of movement of the trip 29 whose engaging face 29a is formed so that the cam action is effected when the trip strikes the trip pin 37 and causes an anticlockwise movement of the trip which withdraws the shoulder 31 thereof from the tail 28 of the striker lifting gear so that the latter can be reversed under the action of the nose of the lever 33 as hereinbefore explained.

The relative positions of the finger member 24 and tail 28 under operation of the trip 29 and the nose of the lever 23 are clearly shown in Figs. 5 to 8 which show the progressive positions from the lifting of the striker to the release of the striker to permit it to fall. Of these figures Fig. 5 shows the trip 29 just going to engage the tail 28 and Fig. 6 shows the completed movement of the striker lifted, the trip just engaging the pin 37. Fig. 7 shows the deflection of the trip member from the tail 28 of the striker lifting gear by engagement of the pin 37 and the engagement of the striker lifting gear by the nose of the member 33. Fig. 8 shows the finger member 24 driven backwards in an anticlockwise movement under the effort from the member 33.

It will be seen that the operation of the striker from the member R is effected through the trip member 29 and to prevent this trip member sticking in the position attained after engaging the trip pin 37 as shown in Fig. 7 in which position the oscillation of the plate 27 would be ineffective as regards the striker, a safety catch in the form of a J member 38 is employed. This member 38 is spring influenced and is disposed to engage the trip member in the deflected position so that on the return of the plate 27 it is caused to rock whereby on the next clockwise movement of the plate 27 the trip member must engage the trip pin 37.

Referring again to the return of the striker lifting member 24 under operation of the nose 35 of the lever 33 it will be clear that in fact the member R both lifts the striker and returns it, the nose 35 being in fact a distance piece between the abutment 32 on the member R and the sleeve member 36 on the shaft 25 so that the member R positively effects the movement of the lifting member 24 in both directions to cause the rise and fall of the striker during one direction of movement of itself.

The object of incorporating the member 25 as part of the escapement mechanism is as hereafter more fully explained to use the carriage tension to assist return of the parts after a complete reciprocation of the striker and to control the unrequired lifting of the check pawl of the escapement.

Instead of using the mechanism just described with reference to Figs. 5 to 8 the striker may be carried by the sheath of an eccentric 39 as shown in Fig. 13 mounted on a rod 25a on which is carried a pinion 40 in mesh with a ratchet 41 actuated by a pawl 42 connected to the actuating member R of the striker. The pawl preferably has two operative faces 43 and 44 and the ratchet is provided with lateral abutments as for example pins 45 disposed so that the movement of the ratchet communicated to the striker through the eccentric 39 is effected by a variable effort which is at a maximum at about half travel of the ratchet. In such mechanism the face 43 first engages a pin 45 and then the effort is transmitted to the face 44 which operates at a shorter leverage, so that the final part of the step movement of the wheel will have greater force, that is to say, that the striker will be moved first of all gradually up with the selector bar and punch and during the movement of striking will be given a maximum effort which also is utilized to withdraw the striker.

In this arrangement also the member R is connected to a lever 32 of the escapement mechanism so that the tension in the carriage can be utilized to assure return of the actuated member R; for one forward movement of the member R the eccentric is turned through an angle of 360° and the sheath reciprocated so that the striker S is raised and lowered. The eccentric is initially set so that the actuating member commences the movement of the eccentric by applying effort at the maximum leverage. By such an arrangement jarring is avoided between the operator's finger and a key when the striker is key operated.

To produce an evenness of torque in the ratchet 41 a braking lever 46 may be disposed in the path of a lug 47 on the pawl 42 so that the rocking of the member 46 under the movement of the ratchet is opposed by the pawl member itself throughout travel of the pawl and the corresponding rotation of the ratchet.

In an alternative construction indicated in Fig. 14 a leaf spring 46a is employed to engage against the pins 45 and so oppose the movement of the pawl 42 thereby an evenness of motion is obtained.

A further modified construction for operating the striker from a key is shown in Figs. 15, 16, and 17.

In this arrangement the actuating member R is in the form of a rack the teeth of which are indicated at 48 and the rack is integral with the part 23 connected to the levers 21 actuated through the keys. A spindle 25a is provided as in the construction shown in Fig. 13 with an eccentric 39 and on the extremity is a pinion 40a which engages with the teeth 48 of the rack actuating member, the rack having sufficient teeth so that in one direction of movement impelled by depression of a key the rack causes a rotation of the eccentric through 360° thereby the striker is lifted and withdrawn.

The rack is connected to the pinion 40a by means of what may be termed a free wheel construction to permit the return of the rack without effecting the punches. Instead of the rack a toothed wheel or quadrant may be employed as will be understood in the art.

The free wheel construction is obtained by cutting the teeth of the pinion of gradually increasing length from a minimum to a maximum so as to have a profile of helical form clearly shown in Figs. 16 and 17 to engage with the end face of a bush 49 carried on the rod 25a, the face of which bush is cut also in the manner of a helix.

When the parts are in normal position the largest teeth of the pinion will lie in the shoulder of the helix, consequently on the actuation of the rack by the depression of the key a forward movement of the rack is produced resulting in driving the pinion clockwise and the eccentrics through 360°. When the key is released the rack returned under the spring pressure hereafter referred to and the helical face working in opposite direction causes the pinion 40a to be laterally displaced and disengaged from the bush 49 thereby the rack is returned without operating the striker.

The spring influence employed in returning the rack is in this construction again obtained from the escapement mechanism of the card feeding carriage the actuating member R being connected to the T-lever 33 hereinbefore referred to by a rod 50 and link 51 thereby the tension of the carriage is employed to return the actuating member R to normal resetting position.

In each of the striker operating mechanisms described the T-lever 33 of the escapement mechanism has been shown in adjustable relation with the actuating member R.

The carriage C has in the usual manner a carriage rack 52 and an extension 53 forming an anchorage 54 for a cable connection 55 to a spring controlled drum 56 on which the spring is indicated at 57, this being the carriage tension.

Viewing Fig. 1 the movement of the carriage to the right causes the spring 57 to be coiled and the energy conserved in the spring is expended in moving the carriage to the left step by step on the operation of the keys on the control of the escapement now to be referred to.

The escapement includes the T member 33 which is pivoted at 58 on the frame of the machine and carries a pin 59 which engages with the check pawl 60 virtually pivoted at 61 on the frame of the machine. Pivoted on the frame of the machine at 62 is a bell crank lever 63 at the upper end of which is formed the actuating pawl 64.

From the foregoing it will be seen that on the depression of any of the keys causing a displacement of the actuating member R that the T-lever 33 is rocked and the check pawl raised out of the carriage rack 52 against the tension of spring 60a which tends to keep the check pawl in the rack and is anchored between the check pawl and the actuating pawl 64.

When the check pawl is in the carriage rack 52 movement of the rack under the carriage tension is prevented, but when it is raised then the carriage can go forward to the extent permitted. The extent of movement is governed by the actuating pawl. This pawl is pulled into the rack by a spring 65 clearly shown in Fig. 1.

It has already been explained that the movement of the actuating member R first caused the operation of the striker and then operated the lever 33, it will be clear, therefore, that towards the end of a downward stroke of a key that the check pawl 60 is lifted out of the rack and premature lift avoided by the abutment of lever 33 on sleeve member 36. At the same time the actuating pawl is engaged in the rack.

In the construction shown in Fig. 1 this is effected by connecting the lower arm of the bell crank 63 to a link 66 by means of a pivot pin 66a to the plate 27 of the striker actuated mechanism, which plate is connected to the actuating member R as aforesaid, consequently the actuating member R, besides actuating the lever 33 and moving the check pawl, also actuates the lever 63 through the agency of the plate 27 and causes the actuating pawl 64 to engage the carriage rack at the same time, all this being effected when the key is fully depressed, the carriage meanwhile being momentarily held by this actuating pawl, thereby the carriage is rigidly held during the punching operation.

As soon as the key is released the check pawl flies back under the actuation of spring 60a and the carriage C has begun to move under the influence of the carriage tension into the next operation so that the check pawl is ready to engage the next tooth of the carriage rack 52, at the same time the carriage actuating pawl is forced up by the force of the teeth of the rack 52 so that the carriage is released to move one tooth space on to the check pawl.

It will be noted that the forcing up of the actuating pawl 64 will cause a movement of the plate 27 which in turn will cause the return of the actuating member R and eventually the resetting of the keys, thereby the tension of the carriage is employed to assure the return to normal position of the striker actuating mechanism and also to reset the keys; this normal position can conveniently be referred to as reset position and, therefore, it can be broadly stated that the carriage tension effects the return of the parts including the keys to resetting position.

This employment of the carriage tension occurs also in the construction shown in Figs. 13 and 14 wherein the lever 63 carrying the actuating pawl is connected to the pawl 42 operating the ratchet 41 controlling the striker.

It will be noted that the pawl is slotted at 67 for the reception of a pin 68 carried by the lever 63, the arrangement being such that on the rocking of the lever 63 by the camming up of the actuating pawl 64 by the teeth of the carriage rack 52, that the ratchet 41 is reset without hindrance to the arcuate movement of the lever 63.

Further it will be noted that in the construction shown in Fig. 15 the forcing up of the actuating pawl causes through the agency of the rod 50 and the link 51, the return of the actuating member R, in this case in the form of a rack, to resetting position, and also the resetting of the keys.

From the foregoing it will be clear that the carriage C which in manner after explained carries the cards, passes punches P and is advanced step by step for each key depression and the punch actuating mechanism is carried to the escapement mechanism of the carriage so that the tension of the carriage operates to produce the return stroke of the actuating member R in a resetting of the keys.

It has just been stated that when the key is fully depressed the carriage rack is momentarially held by the carriage actuating pawl. It is of interest here to note the movements of the check pawl and actuating pawl in comparison with the movements of the striker actuating the punches. The depression of a key causes the striking and withdrawal strokes of the striker, therefore, at about half of the down stroke the actual act of striking the punches occurs.

Now at this moment, the check pawl is still in engagement with the carriage rack, though perhaps slightly removed from its normal position, also the actuating pawl has been partly introduced into the rack teeth, therefore at the moment of striking the rack is actually held by the check pawl and the actuating pawl. The carriage, therefore, is rigidly and accurately held in position during a striking operation by the arrangement of check pawl and actuating pawl and operating means operated by the key as hereinbefore set forth.

The described arrangement of check pawl and actuating pawl and their control has the advantage also that should for any reason the carriage stick in its step by step progress the actuating pawl cannot be engaged with the carriage rack, hence the key cannot be depressed.

It is also of interest here to refer to the arrangement of vertical punches with sufficient weight and loosely mounted in their guides so that they may fall by gravity on the withdrawal of the striker, although as hereinbefore described the striker is employed to positively return the punches after each operation.

By utilizing freely sliding punches no springs are employed, consequently the operation will become lighter as the machine becomes freer, that is to say, the machine will improve and not deteriorate as used.

Instead of the T-lever 33 any bell crank or other form of lever could be employed to operate the check pawl on the depression of a key, the reason for using the T lever being to simplify the construction of a skip mechanism which comprises the thumb plate or finger plate 69 on the end of the T piece away from the check pawl. By depressing the finger plate 69 the T lever is rocked and the check pawl raised without moving the actuating pawl lever 63, consequently the carriage C is free to skip the whole length of its travel.

The carriage may also be skipped through predetermined intervals through the agency of a key 70 termed the skip key. This key is connected by a U-shaped lever 71 to a pintle 72 forming the pivot of a graduated scale bar 73 carried in a bearing member 74 on the frame of the machine, the lever 71 being clamped to the pintle 72 by the clamping piece indicated at 75, the arrangement being such that depression of the key causes the graduated scale bar 73 to be rocked and dog members 76 adjustable thereon disposed in the path of an abutment 77 carried on the extensions 53 of the carriage.

Conveniently as shown in Fig. 1 the dogs are bifurcated members straddling the scale 73 and engaging in slots formed at the top and bottom of the scale. In practice these dogs are arranged at intervals to control in a predetermined manner the skipping of the carriage on depression of the key 70.

This movement of the scale bar is communicated by the lug 78 to a rocking lever 79 engaging a lug 80 on the T-lever 33 so that the rocking of the scale by the depression of the skip key causes the lug 78 to move upwardly and depress the clear end of the T lever and consequently the lifting of the check pawl 60.

Apart from the skipping mechanism the carriage may also be moved along at intervals of one tooth without moving a selector bar B. To this end a spacing key 81 is employed which engages on the rocking lever 19 so that the actuating member R is moved and consequently the check pawl raised and the actuating pawl simultaneously operated to control the movement of the carriage through one tooth space.

In Figs. 18 and 19 a modified form of dog is indicated at 76a. In this form of construction the dog is of plate form and recessed on its underside as indicated at 82 and the graduated scale member 73 accordingly need be slotted only on the upper side. The dog is dropped into position and gripped thereat by the spring as indicated at 83.

In a preferred construction the carriage comprises as shown in Figs. 20 to 23, pivoted grippers 100 in form triangular plates pivoted at their apices indicated at 101, each gripper being controlled by a spring 102 so that one base corner is pulled towards an abutment 103 so that a card may be gripped between the grippers 100 and the abutment.

In form the carriage resembles a plate on edge and these grippers are in parallel relation therewith.

The grippers are controlled by a common trip bar 104 which when moved in the direction of the arrow 105, Fig. 22, moves the grippers to operative position. The trip bar is pivotally connected at one end, see 104a, to a bell crank member 106 and at the leading end is associated with a spring detent 107, carrying a pin 107a passing through the carriage and provided with a spring 107b.

When the carriage has moved to the end of its travel with a card, which in Figs. 22 and 23 is indicated by the reference X, the bell crank 106 moves over a stop 108 carried on the frame of the machine. The bell crank 106 is spring controlled as indicated at 109 and is mounted with an end plate on its pivot so that as the carriage moves to the end of its travel the bell crank is deflected and wiped past the stop 108, it then becoming disposed so as to pass over the stop immediately after the return movement of the carriage commences. On the commencement of this return movement the bell crank rides over the stop and is raised, consequentially moving the trip bar in opposite direction to the arrow 105, Fig. 32 thereby causing the grippers to move away from the abutment 103 so that a card X is free to fall therefrom, the grippers being then in open position as shown in Fig. 20.

Immediately the trip bar 104 has been pressed forward its end is engaged by the detent 107 aforesaid and thereby holds the grippers open until the carriage has been brought to resetting position for the commencement of the new forward movement.

On the support 1 of the machine is a pin termed register pin 110, most clearly shown in Fig. 2, this pin being spring controlled and operable through the agency of a rocking plate 111 clearly shown in Figs. 1 and 2.

The support 1 of the punches is formed with a pinion 112, see Fig. 2 which provides a positive guideway for the carriage, the part 53 of the carriage riding in the bottom of the slot.

The carriage C is perforated as indicated at 113, Figs. 20 and 22, so that the detent may be pushed away from abutment with the trip bar 104. The register pin on the support is located with regard to the punches P so that unless the carriage is pulled right home on the return journey the pin cannot pass through the carriage and engage the detent, whereas when the carriage is pushed home correctly the plate 111 can be locked and the pin 110 projected through the support 1, the perforation 113 in the carriage and on to the detent 107 which is then deflected from the abutting position with the locking bar, the latter then moving in the direction of the arrow 105, Fig. 22, under the influence of the springs 102 of the grippers so that the end of the locking bar is in overlapping relation with regard to the detent 107, see Fig. 22. In this position the grippers snap up against the abutment or against the card if one is interposed between the grippers and the abutment 103 or the carriage.

It will be seen therefore, that the carriage is so constructed that a card cannot be gripped by the carriage until the carriage is in correct relation with the punches and with the carriage is positively guided by the punches. The carriage may be provided with a gear 114 to facilitate manipulation.

In association with the carriage as hereinbefore described, it is preferred to form in the machine a carriage magazine and a picker mechanism operating synchronously with the carriage. To this end there is mounted between the support 1 of the punches and a support 115, a picker 116 the operating edge of the picker being parallel to the carriage so that a card engaged thereby is correctly aligned with the carriage when the grippers close upon it. The picker is mounted so as to overlap the card to be removed towards the carriage for a distance slightly less than its thickness, so that in moving the card forward the card is slid towards the carriage without the picker engaging the next juxtaposed card. The cards preferably are carried on a plate or platform 117, clearly shown in Figs. 10, 24 and 25, which is spring controlled to press the pile of cards against a transparent, as for example, glass, cover 118.

On the other side of the pile of cards to the picker is a throat knife 119 which extends to the card being moved by the picker so as to prevent the juxtaposed cards from being moved onto the carriage by friction during the movement of the top card of which the knife 119 is clear.

The picker is operated to push the card against the carriage just before the end of its travel so that the abutment 103 and the grippers 100 pass over and under the longitudinal edge of a card respectively during the final movement of the carriage until it is in correct register position before explained, thereon the projection of the pin 110 causes the operation of the grippers to grip the card so fed to the carriage.

The final movement of the carriage is effected at the expense of tensioning the spring designed to return the carriage to register position, in which position the card gripped by the carriage is just clear of the throat knife thereby any obstruction caused by the knife due to deflection in the card is avoided.

The picker is guided in its movements by the horizontal guideways 120 in the supports 1 and 115 before referred to, and it is operated by a rocker shaft 121 carried between these supports and provided with short rocker arms 122, one towards each end of the picker and having spherical ends which loosely engage in similar recesses formed in the upper face of the picker. By such an arrangement the picker can be moved from towards one side of the rocker shaft 121, under it, to the other in the feeding movement. This movement is automatically effected from the carriage, the latter being provided with a shoulder 123 which during the final movements of the carriage engages one arm 124 of a bell crank pivoted at 125, see Fig. 11, the other arm 126 of which actuates a spring controlled finger 127 on the rocker shaft, thereby on the final movements of the carriage the picker knife feeds forward the card to the carriage, the return of the picker being effected by the spring 128 controlling the finger 127.

The plate or platform 117 in association with the glass top 118 comprises a magazine for the cards, and the plate 117 forms in fact a false bottom to the magazine of which the glass 118 is the top. The plate 117 is supported by springs so that the top card is always pushed against the glass 118. To this end the plate 117 is provided along its longitudinal edges with guides 129, see Fig. 10, to receive the ends of rocking arms 130 pivotally carried at the bottom of the magazine so that the plate 117 with the arms forms in nature a cradle about the magazine springs 131.

The magazine is preferably at the rear formed with a hinged wall 132 the pivot of which is indicated at 133, see Fig. 24. When this wall is dropped down an opening to the magazine through which the cards may be introduced on to the plate 117 is provided, and in order that the collapse of the cradle and the lowering of the platform for the reception of a pile of cards may be automatically effected when the wall 132 is dropped down, the wall is provided with cam plates 134 which bear on lugs 135 mounted on a spindle which forms the pivot of the respective rocker arm 130 so that when the hinged wall is dropped down the cams 134 at each end thereof engage the respective lugs 135 and cause the respective rocker arms 132 to be lowered so that the plate is collapsed and the plate 117 pulled down at the expense of tensioning springs 131. The cradle in collapsed position is clearly shown in Fig. 25 the magazine then being ready for charging.

Fig. 10 and Fig. 24 show the parts when practically the last card is leaving the magazine.

In the lowermost position of the hinged wall the cam plates 134 act as abutments between the lugs 135 aforesaid preventing the return movement of the lugs under effort of the magazine springs 131. However, when the hinged wall is raised the tension in the magazine spring is utilized to keep the lugs bearing against the plates so that the false bottom of the magazine rises to push cards to the top of the magazine as the hinged wall is rocked up to close the magazine.

From the foregoing description it will be clear that a card is automatically taken from the top of a pile arranged in parallel relation with the carriage by the picker and delivered by the picker to the carriage to be held thereby in cantilever fashion.

To assure the correct longitudinal relation of the card with the carriage at the time that it is gripped in the carriage, the magazine is formed so that one wall thereof 136 sets the card in correct position in conjunction with the picker, this wall being at right angles to the carriage.

In order to assure that the cards lie against this wall before being moved by the picker, an aligning shutter is provided, see Fig. 1. This shutter is in the form of a hinged flap carried on the frame of the machine behind the punches P, being spring controlled by a spring indicated at 138 so that the flap tends to move towards the punches, the flap being operated by a stop such as 139 carried by the carriage so as to move the flap and cause it to pat the cards as the carriage is returning and just prior to the delivery of the cards by the picker to the carriage.

By such an arrangement a carriage and feeding arrangement is provided whereby the carriage accurately picks up the card at one end of its stroke. The card being gripped by the carriage and held in cantilever fashion is then traversed over the punches P and through the narrow opening between the die plate 4 and the top guide 2 of the punches P, the card moving step by step through the operating zone as the keys are depressed thereby on each depression of the key the card held in cantilever fashion is moved over the punches, the punch is operated and the card fed forward ready for the next key depression.

By such an arrangement not only does the carriage correctly pick up the card but it is accurately delivered to the punches, the carriage being guided by the carriage supports and at the end of a punching operation on a card and the commencement of the return of the carriage through the agency of the bell crank 106, the grippers are caused to release the card which drops from the carriage.

Instead of utilizing a magazine with a transparent or open top and means for removing the cards from the top, a magazine may be employed with means for removing the cards from the bottom to the carriage; such a construction is indicated in Figs. 25 and 26.

Herein a platform 140 is shown, fixed to the machine frame, on which the cards may be mounted and the cards delivered from the bottom of the pile by a picker to the carriage; the picker 116a is moved on to a guide 141 passing through bearings 142 arranged transversely of the platform, and a rocker arm 143 pivoted under the platform and away from the carriage, but engaged by the carriage to move the guide 141 through its bearings and thence to the picker 116a. To this end the rocker arm 143 pivoted at 143a is by pin and slot engagement indicated at 144 connected to a second rocking lever 145 pivoted at 145a, which in turn has a bifurcated end 146 straddling the pin 147 on the guide 141 so that as the arm 143 is moved by the shoulder 123 on the carriage returning to resetting position the picker is moved transversely to the platform 140 to bring the card to the carriage, and on the step by step forward movement of the carriage the rocker arm is gradually released allowing a movement of the picker back again to position behind the cards ready to move forward the next bottom card when the carriage is returned after the completion of the operations on the card then carried by the carriage.

The rocker arm 143 is controlled by a spring 148 which tends to keep it in engagement with the shoulder 143 of the carriage when engaged thereby and which assures the return of the picker to operative position after the carriage has commenced its forward movement.

To assure the proper relation of the cards and the carriage in this construction a platform is provided with an abutment 136a, see Fig. 25, arranged at right angles to the carriage so that the card lying against the carriage and against the abutment is correctly given to the carriage when the carriage is in position to receive and grip the card. In this construction a flap such as 137 is also employed to assure the abutment of a card against a guide 136a previous to its reception by the carriage.

Referring to the operation of the picker in the construction illustrated in Figs. 1 and 11 a modification may be employed consisting in providing the picker with a spring controlled bell crank pivoted on the hinge line of the picker the bell crank being operated by a further crank, an arm of which is disposed in the path of the carriage.

The cards on which a perforating process has been completed may be discharged in a suitable box conveniently disposed at the end of the machine.

Preferably, however, the machine comprises an attachment of skeleton form for the reception of the cards as they are dropped by the grippers.

A preferred arrangement is shown clearly in Fig. 1, this includes a ledge 149 on the supports 1 to each side of the punches and opposed ledges 150 in the same horizontal plane on an arm 151 adjustably disposed at the side of the machine between guide stops 152 and 153, clearly shown in Fig. 10. Associated with the member 151 and the ledges 150 carried thereon are vertical guides 154 for the cards. As the carriage commences its return journey and the grippers release the cards it falls away from the carriage on to the fingers 154 and drops on to the ledges 149 and 150 on which the discharged cards are stacked.

The member 151 is longitudinally displaceable between guides 152 and 153 with the skeleton receptacle so formed as adapted to receive cards of various sizes, and the disposition of the ledges 149 and 150 with regard to the carriage may be varied vertically by disposing the longitudinal member 151 between stops 152a and 153a the stops 152 and 153 as clearly indicated in Fig. 10 by the dot and pick lines 151a showing the disposition of the longitudinal member. In this position of the longitudinal member the ledges 149 will have to be correspondingly raised and to this end the ledges 149 are adjustably mounted on the supports 1.

By the present invention a novel method of feeding cards is attained which consists in feeding the cards to a machine such as a punch for operation thereon, by moving the card edgewise, transversely to its intended direction of travel, to a carriage which is set parallelly to the direction of travel, and gripping the long edge of the card and traversing it in the required longitudinal direction through the aforesaid apparatus, such as the punching machine, until the operation is completed, thereby there is a definite position of the card for every position of travel of the carriage which is always exact, because from the moment it is gripped by the carriage the card forms an integral part of the carriage.

Moreover, the location of the card to the carriage by the location of the carriage itself and the abutments cooperating with the aligning shutter produces the correct setting of the card by two definite locating surfaces at right angles to one another, and, therefore, the correct positioning of the card before it is gripped by the carriage.

In the utilization of a carriage according to the invention with a punch operating on a card divided into columns, the escapement and the teeth of the carriage rack are designed so as to permit a step movement equivalent to the width of a column and, therefore, as already explained, the card is definitely accurately dispositioned at each movement of the carriage for correct operation such as punching on the card.

A card feeding mechanism incorporated in a key action punch, as herein described, has the advantage that it is operated by one of the movements already incorporated in the punching machine. Further, the card feeding, gripping and ejecting means together with the aligning means for the cards are all operated by one movement, thereby eliminating the necessity of operating several keys or levers or doing the operation manually.

As already indicated the carriage per se, by reason of its gripping means, may be used for other purposes than for moving a card through an apparatus such as a punch, for instance, the carriage can be used for moving the card for such purposes as printing a date, a serial number, or a signature on the cards and in such cases it might be only necessary to move the carriage in two long stages instead of short steps as attained by ordinary key action mechanism.

A further advantage arising from the carriage and gripping means in conjunction with the feeding mechanism is that the card is visible immediately before commencing an operation on it and to a great extent during the operation, whilst the combination with the feeding mechanism of a machine with a drop down wall for pushing the pile of cards up to feeding position, as herein described, attains a construction whereby the magazine can be opened and closed by a simple movement, and the closing movement effects a stacking of the cards correctly and a correct spring tension on the card support to hold the top card at correct feeding position.

What we claim is:—

1. A statistical card feeding mechanism including in combination a carriage in the form of a plate on edge, grippers in the form of spaced plates pivoted to one face of said carriage, an abutment overlying each said gripper, springs connecting said grippers and carriage tending to move the grippers against said abutment to grip a card there-between, operating means connecting said grippers and adapted to tilt said grippers simultaneously about their pivots away from said abutment, means for holding said grippers in such removed position, and means for releasing said grippers simultaneously for return to said abutment.

2. A statistical card feeding mechanism including in combination a platform, a carriage in the form of a plate on edge, grippers in the form of spaced plates pivoted to one face of said carriage, an abutment overlying each said plate, springs connecting said grippers and carriage tending to move the grippers against said abutment to grip a card therebetween, a lever mounted on said carriage, means connecting said lever to said grippers, co-operating means on said platform to actuate said lever after a predetermined movement between the carriage and platform, means for holding said grippers in the position enforced by actuation of said lever, and means for releasing said grippers after a predetermined interval to permit their return to said abutment.

3. A statistical card feeding mechanism including in combination a platform, carriage in the form of a plate on edge, grippers in the form of spaced triangular plates, pivoted by one corner on said carriage, an abutment overlying said plates, springs controlling said grippers tending to move them up against said abutment to grip a card there-between, means for automatically moving said grippers about their pivots to bring them to open position at a predetermined position of travel of the carriage with regard to the platform and means for releasing said grippers for returning into gripping position against said abutment under the influence of the springs.

4. A statistical card feeding mechanism including in combination a platform, a carriage in the form of a plate on edge, grippers in the form of spaced triangular plates, pivoted by one corner on said carriage, an abutment overlying said plates, springs controlling said grippers tending to move them up against said abutment to grip a card therebetween, a bar connecting said grippers, a lever pivoted on said carriage, and hinged to said bar, an abutment on said platform disposed to rock said lever on relative movement between the carriage and platform and move said grippers at the expense of tensioning their springs, a spring detent engaging the end of said bar thereby holding the grippers, and means for removing said detent from the end of said bar to permit return movement of the bar and grippers under the influence of the springs.

5. A carriage for moving cards, sheets, or the like one by one constructed in the form of a plate on edge, grippers in the form of spaced plates pivoted to one face of said carriage, an abutment overlying each said gripper, springs controlling said grippers and tending to move them against said abutment, operating means connecting said grippers adapted to tilt said grippers simultaneously about their pivots away from said abutment, means for holding said grippers in such removed position and means for releasing said grippers simultaneously for return to said abutment.

6. A statistical card feeding mechanism comprising in combination a carriage, a support for the carriage, grippers on said carriage adapted to engage the card, actuating means for opening said grippers, means holding the grippers open, and registering means for said carriage carried by said support controlling the holding means for said grippers whereby the carriage is first disposed in correct relation with said support before it engages the card.

7. A statistical card feeding mechanism including in combination a platform, a carriage in the form of a plate on edge, a support for said carriage, grippers in the form of spaced triangular plates pivoted by one corner of said carriage, an abutment overlying said plates, springs controlling said grippers tending to move them up against said abutment to grip a card therebetween, a bar connecting said grippers, a lever pivoted on said carriage and hinged to said bar, an abutment on said platform disposed to rock said lever on predetermined relative movement between the carriage and platform and move said grippers at the expense of tensioning their springs, a spring detent engaging the end of said bar thereby holding the grippers, a spring controlled pin in said carriage support disposed to displace said spring detent whereby the grippers are actuated under the influence of their springs only on a predetermined relation of the carriage to the platform.

8. A statistical card feeding mechanism comprising in combination a carriage, a support for the carriage, grippers on said carriage adapted to engage the card, actuating means for opening said grippers, means holding the grippers open, registering means for said carriage carried by said support controlling the holding means for said grippers whereby the carriage is first disposed in correct relation with said support before it engages the card, means for supporting a plurality of cards, a picker for feeding the cards one by one to the carriage and means for operating the picker just prior to the registration of the card with the support.

9. A statistical card feeding mechanism comprising in combination a carriage, a support for the carriage, grippers on said carriage adapted to engage the card, actuating means for opening said grippers, means holding the grippers open, registering means for said carriage carried by said support controlling the holding means for said grippers whereby the carriage is first disposed in correct relation with said support before it engages the card, means for supporting a plurality of cards, a picker for feeding the cards one by one to the carriage, means for operating the picker just prior to registration of the carriage with the support, and means for aligning the card in correct relation with the carriage controlled by the carriage for operation just prior to the carriage reaching registration position.

10. A statistical card feeding mechanism comprising in combination a carriage, a support for the carriage, grippers on said carriage adapted to engage the card, actuating means for opening said grippers, means holding the grippers open, registering means for said carriage carried by said support controlling the holding means for said grippers whereby the carriage is first disposed in correct relation with said support before it engages the card, means for supporting a plurality of cards, a picker for feeding the cards one by one to the carriage, means for operating the picker just prior to the registration of the card with the support, a shutter hinged on said carriage support at right angles to the picker, operating means on said carriage for rocking said shutter and an abutment on said card support arranged parallelly to said shutter whereby a card is aligned along two contiguous edges prior to being gripped in the carriage.

11. Statistical card feeding mechanism comprising in combination a carriage, grippers on said carriage, controlling means for said grippers mounted on said carriage, an associated abutment for actuating said control means after a predetermined travel of said carriage, a support for said carriage, a registering means for said carriage carried by said support, means for holding said grippers open actuated by said registering means whereby the grippers function at a predetermined position of the carriage, a picker for feeding cards to said carriage arranged parallelly thereto, an abutment arranged at right angles at one end of said picker, a hinged flap arranged at the other end of said picker, means carried by said carriage for actuating said flap just prior to the carriage arriving at registering position, whereby the card is squared up for correct presentation to the carriage before being engaged by the carriage.

12. Statistical card feeding mechanism comprising in combination a carriage, grippers on said carriage for engaging a card edge, means for automatically operating said grippers at a predetermined interval of travel whereby a card is engaged, means for actuating said grippers to release said card after the period of travel, a magazine including an open top located parallelly with said carriage, resilient means maintaining the top card at a level of the grippers in the carriage and a picker for presenting the top card edgewise to said carriage operated by said carriage.

13. Statistical card feeding mechanism comprising in combination a carriage, grippers on said carriage for engaging a card edge, means for automatically operating said grippers at a predetermined interval of travel whereby a card is engaged, means for actuating said grippers to release said card after the period of travel, a magazine including an open top located parallelly with said carriage, resilient means maintaining the top card at a level of the grippers in the carriage, a rocker shaft arranged over the magazine, a picker on said rocker shaft, a ramp on said carriage, a bell crank disposed to be actuated by said ramp on the travel of the carriage and means connecting said bell crank with said rocker shaft whereby the picker is actuated as the carriage arrives opposite the magazine and just prior to attaining registering position.

14. A card feeding mechanism according to claim 13 comprising the combination with the rocker shaft of short arms on said rocker shafts each said short arm including a spherical end for engaging in a recess on the face of the picker, horizontal guides for said picker, the connection between the spherical ends of the said short arms and the picker being of free nature so as to permit the travel of the picker from position to one side of the rocker shaft under it to the other side.

15. Card feeding mechanism according to claim 12 comprising a magazine including a collapsible cradle and a spring arranged to maintain the cradle open, a wall on said magazine hingedly mounted, means connecting said hinged wall with said cradle whereby lowering the wall collapses the cradle and locks it in position for loading whilst raising the wall releases the cradle to press a card to the top under the influence of the spring associated with the cradle.

16. Card feeding mechanism comprising in combination a carriage, grippers on said carriage for engaging a card edge, means for automatically operating said grippers at a predetermined interval of travel whereby a card is engaged and released after the period of travel, a magazine having an open top associated with said carriage, a picker, a picker actuated by said carriage for feeding the cards edgewise thereto, said magazine including a collapsible cradle, resilient means for opening said cradle and cranked arms for closing said cradle, a wall to said magazine hingedly mounted means connecting said wall with said cranked arms whereby on lowering the wall the cranked arms are caused to collapse the cradle and to hold it in collapsed position for charging.

In testimony whereof we hereby affix our signatures.

ARTHUR THOMAS.
RICHARD FITZ POWER.